(12) United States Patent
Jacobine et al.

(10) Patent No.: US 7,728,092 B1
(45) Date of Patent: Jun. 1, 2010

(54) ANAEROBICALLY CURABLE COMPOSITIONS

(75) Inventors: Anthony F. Jacobine, Meriden, CT (US); Joel D. Schall, Hamden, CT (US); John G. Woods, Farmington, CT (US)

(73) Assignee: Henkel Corporation, Rocky Hill, CT (US)

( * ) Notice: Subject to any disclaimer, the term of this patent is extended or adjusted under 35 U.S.C. 154(b) by 1050 days.

(21) Appl. No.: 11/279,661

(22) Filed: Apr. 13, 2006

(51) Int. Cl.
*C08F 20/06* (2006.01)

(52) U.S. Cl. .................. 526/317.1; 526/319; 526/320; 526/229; 526/205; 526/204; 525/343; 525/374; 525/383

(58) Field of Classification Search ................ 526/319, 526/320, 317.1, 229, 205, 204; 525/343, 525/374, 383
See application file for complete search history.

(56) References Cited

U.S. PATENT DOCUMENTS

| | | | |
|---|---|---|---|
| 3,218,305 A | 11/1965 | Kriebel | |
| 4,180,640 A | 12/1979 | Melody et al. | |
| 4,262,106 A | 4/1981 | Frauenglass et al. | |
| 4,287,330 A | 9/1981 | Rich | |
| 4,321,349 A | 3/1982 | Rich | |
| 4,413,108 A | 11/1983 | Janssen | |
| 4,447,588 A * | 5/1984 | Rametta | 526/301 |
| 4,500,608 A | 2/1985 | Rametta | |
| 4,528,059 A | 7/1985 | Janssen | |
| 5,116,558 A | 5/1992 | Wrobel et al. | |
| 5,312,871 A | 5/1994 | Mardare et al. | |
| 5,605,999 A | 2/1997 | Chu et al. | |
| 5,763,548 A | 6/1998 | Matyjaszewski et al. | |
| 5,811,473 A * | 9/1998 | Ramos et al. | 523/176 |
| 6,583,289 B1 * | 6/2003 | McArdle et al. | 548/123 |
| 6,835,762 B1 * | 12/2004 | Kelmarczyk et al. | 523/176 |
| 6,897,277 B1 * | 5/2005 | Klemarczyk et al. | 526/215 |
| 6,958,368 B1 * | 10/2005 | Klemarczyk et al. | 523/176 |

FOREIGN PATENT DOCUMENTS

CA 2 540 698 A1 9/2004

OTHER PUBLICATIONS

R. D. Rich, "Anaerobic Adhesives", *Handbook of Adhesive Technology*, 29, pp. 467-479, A. Pizzi and K.L. Mittal, eds., Marcel Dekker, Inc., New York (1994).

H. Tang et al., Highly Active Catalyst for AGET ATRP Tertiary Amine as Reducing Ager *Polym. Preprints*, 47(1), pp. 156-157 (2006).

* cited by examiner

*Primary Examiner*—Ling-Siu Choi
(74) *Attorney, Agent, or Firm*—Steven C. Bauman

(57) ABSTRACT

The present invention relates to anaerobically curable compositions based on (meth)acrylate-functionalized poly(acrylate) polymers.

19 Claims, 1 Drawing Sheet

ANAEROBICALLY CURABLE COMPOSITIONS

BACKGROUND OF THE INVENTION

1. Field of the Invention

The present invention relates to anaerobically curable compositions based on (meth)acrylate-functionalized poly(acrylate) polymers.

2. Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

For certain commercial applications, apart from that technology disclosed in U.S. Pat. No. 5,116,558 (Wrobel), conventional anaerobically curable compositions ordinarily do not develop the physical property profile to satisfy performance standards of customers. One such commercial application is a gasketing application.

Certain polyacrylate materials have been designed and developed by Kaneka Corporation for photocurable applications. The route by which these materials are synthesized involves the use of copper (I) salt catalysts, such as copper halides like copper chlorides, copper bromides and copper iodides, which despite extensive purification measures, carry over as impurities at significant concentrations in commercially available polyacrylate materials, such as those referred to by Kaneka under the trade designation XMAP and/or Telechelic polyacrylates. Copper (I) salt impurities such as these lead to poor stability in anaerobically curable compositions. These synthetic routes—commonly referred to as atom transfer radical polymerization or ATRP—are believed to be similar to those described for instance in U.S. Pat. Nos. 5,312,871 (Mardare) and 5,763,548 (Matyjaszewski). Certain polyacrylate materials have been designed and developed by Kaneka Corporation for photocurable applications. The route by which these materials are synthesized involves the use of complexed copper halide catalysts, which despite extensive purification measures, carry over as impurities at significant concentrations in commercially available polyacrylate materials, such as those referred to by Kaneka under the trade designation XMAP and/or Telechelic polyacrylates. Copper compound impurities such as these lead to poor stability in anaerobically curable compositions. These synthetic routes are believed to be similar to those described for instance in U.S. Pat. Nos. 5,312,871 (Mardare) and 5,763,548 (Matyjaszewski). See also H. Tang et al., "Highly Active Catalyst for AGET ATRP Tertiary Amine as Reducing Agent", *Polym. Preprints*, 47(1), 156 (2006), in which the issues attendent with residual copper catalyst from ATRP syntheses are highlighted.

To date, again, apart from that technology disclosed in the '558 patent, it is not believed that an anaerobically curable composition based on (meth)acrylate-functionalized poly (acrylate)s suitable for gasketing applications has been successfully offered for sale commercially or described in the literature. Cf. THREE BOND product no. 1133EC, which is believed to be a polyester-urethane-methacrylate-based composition. Accordingly, it would be desirable for anaerobically curable compositions to be suitable in terms of physical property profile so that they may be viable candidates to satisfy performance standards of customers for gasketing applications.

SUMMARY OF THE INVENTION

The present invention provides anaerobically curable compositions suitable in terms of physical property profile to satisfy performance standards of customers for gasketing applications.

The inventive anaerobically curable compositions include (a) a (meth)acrylate component comprising a (meth)acrylate-functionalized poly(acrylate), such as one containing at least two (meth)acrylate functional groups; (b) an anaerobic cure-inducing composition; and (c) a combination of a copper salt and a sequestering agent.

The (meth)acrylate-functionalized poly(acrylate) is a telechelic one made by the so-called "living or controlled radical polymerization", taught and disclosed by for instance U.S. Pat. Nos. 5,312,871 (Mardare) and 5,763,548 (Matyjaszewski), by which polymers having a predetermined number average molecular weight and a surprisingly narrow molecular weight distribution (Mw/Mn), within the range of 1.01 to 1.6, such as 1.15, may be achieved. By this polymerization method, essentially no chain transfer or chain termination is reported to occur. While the '871 patent process does not disclose copper or other transition metals as catalysts, commercially available sources of these (meth)acrylate-functionalized poly(acrylate) are believed to routinely use such catalysts in their preparation.

While the use of chelators is known in the anaerobic adhesive literature to remove trace metal impurities (see e.g. U.S. Pat. No. 4,262,106), stability is ordinarily improved by removal of the active metal by precipitation from the adhesive mixture. In addition, the active metal is typically described to be iron.

The complex of copper and sequestering agent recited herein is significant because the sequestering agent used has a greater impact on stability of the inventive anaerobically curable composition than the complex believed to be formed from bispyridyl (added by the manufacturer to improve stability) and the residual copper from the reaction process used to manufacture the (meth)acrylate-functionalized poly(acrylate), as is described below and demonstrated below in the Examples section.

This invention also provides anaerobic curable compositions and anaerobic curable composition systems prepared with such cure accelerators, methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

DETAILED DESCRIPTION OF THE INVENTION

Figure 1:
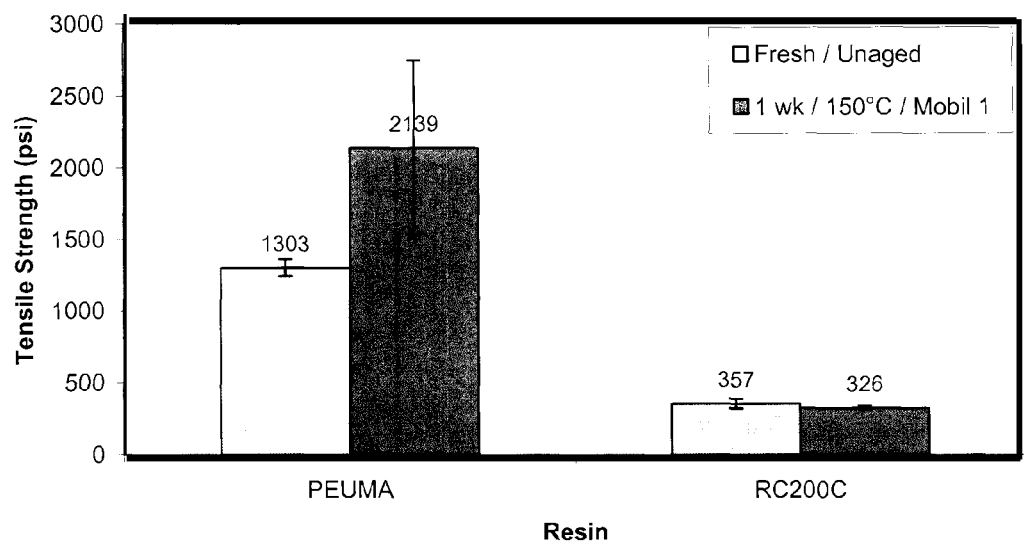
FIG. 1 depicts a chart of tensile strength values captured for a PEUMA composition and a Kaneka RC200C composition, each having been exposed to ageing conditions in Mobil 1 synthetic 0W-30 motor oil for a period of time of one week at a temperature of 150° C. and being unaged.

The present invention provides (a) a (meth)acrylate component comprising a (meth)acrylate-functionalized poly (acrylate), such as one containing at least two (meth)acrylate functional groups; (b) an anaerobic cure-inducing composition; and (c) a combination of a copper salt and a sequestering agent.

The (meth)acrylate-functionalized poly(acrylate) desirably has at least two (meth)acrylate functional groups, is the combination of two or more mono-functionalized (meth) acrylate-functionalized poly(acrylate)s, or is a mono-functionalized (meth)acrylate-functionalized poly(acrylate) in combination with a (meth)acrylate-functionalized poly(acrylate) having at least two (meth)acrylate functional groups.

The (meth)acrylate-functionalized poly(acrylate)s may be derived from a blend of at least 80% by weight of certain mono-functionalized (meth)acrylate monomers selected from alkyl, arylalkyl, hydroxy alkyl, and phenyl (meth)acrylates and 0-20% by weight of mono-functional, non-(meth) acrylate vinyl monomers selected from maleic anhydride, maleate, fumarate and vinyl esters, acrylonitrile, styrene, butadiene, vinylazlactone, N,N-dimethylacrylamide, N-vinylpyrrolidinone, acryloyl morpholine, N-vinylcaprolactam and N-vinylformate.

The (meth)acrylate-functionalized poly(acrylate) may in other words be defined with respect to the following backbone:

where A represents one or more co-monomer units selected from non-functional alkyl or arylalkyl mono (meth)acrylates and represents one or more co-monomer units selected from alkyl or arylalkyl mono-functionalized (meth)acrylates selected from alkoxyalkyl or aryloxyalkyl with or without substitution with groups containing the hetero atoms, O, S, N, P, or halogen, or non-(meth)acrylate vinyl monomers such as maleic anhydride, where x and y represent the fraction of A and B, respectively, and x is at least 0.30 and at most 0.95 and y is at least 0.05 and at most 0.70. While the structure above suggests a block copolymer, random incorporation of the A and B units distributed within the polymer backbone may occur, and may be preferable.

The (meth)acrylate-functionalized poly(acrylate) has an average molecular weight in the range of 1,000-100,000, such as in the range of 5,000-50,000.

Commercially available examples of these (meth)acrylate-functionalized poly(acrylate) include those promoted by Kaneka Corporation under the trade designation, XMAP and/or Telechelic polyacrylates. These (meth)acrylate-functionalized poly(acrylate)s are referred to as telechelic because of the location of the (meth)acrylate functionality at the chain ends, with approximately two (meth)acrylate functional groups per molecule. Commercial grades are indicated as RC100C, RC200C, RC220C, RC210C and RC200M. They are promoted by the manufacturer as UV or heat curable polymers, which may be formulated with silica filler, antioxidant, stabilizer and initiator.

Desirable anaerobic cure-inducing compositions to induce and accelerate cure of the inventive compositions may include saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g. U.S. Pat. Nos. 3,218,305 (Krieble), 4,180,640 (Melody), 4,287,330 (Rich) and 4,321,349 (Rich).

In addition, more recently Henkel Corporation has discovered a series of anaerobic cure accelerators, some of which are set forth below:

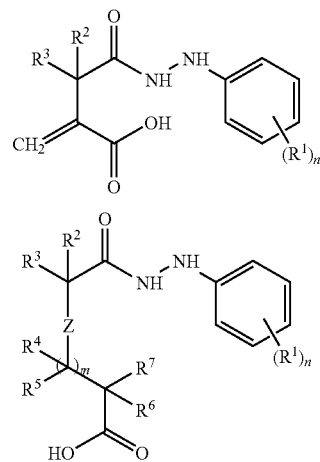

where $R^1$, $R^2$ and $R^3$ are each independently selected from hydrogen or $C_{1-4}$; Z is a carbon-carbon single bond or carbon-carbon double bond; m is 0 or 1; and n is an integer between 1 and 5;

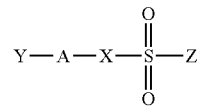

where Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded therefrom;

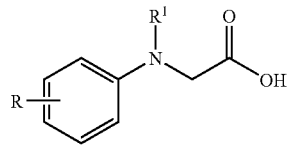

where R is hydrogen, halogen, alkyl, alkenyl, hydroxyalkyl, hydroxyalkenyl, carboxyl, or sulfonato, and $R^1$ is as defined above and alkenyl, hydroxyalkyl, hydroxyalkenyl, or aralkyl. See U.S. Pat. Nos. 6,835,762, 6,897,277 and 6,958,368.

In addition, Loctite (R&D) Ltd. designed anaerobically curable compositions using the following trithiadiaza pentalenes as a cure accelerator:

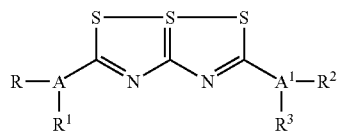

where A and $A^1$ may be selected from O and N; and

R, $R^1$, $R^2$ and $R^3$ may be the same or different, are as defined above and cycloalkyl, cycloclkenyl, and aryl, having from 1 to about 30 carbon atoms, and may be substituted or interrupted with a heteroatom, and heterocyclic structures, or $R^1$ and $R^3$ taken together may join to form a cyclic structure having from about 20 to about 28 ring atoms, and together represent dialkyl substituted polyether structures that may be substituted or interrupted with the trithiadiaza pentalene structure, which itself may or may not be substituted by $A^1$, $R^2$, or $R^3$, as defined above. See U.S. Pat. No. 6,583,289 (McArdle).

Triazine/thiol anaerobic cure systems may also be used in the practice of the present invention. For instance, U.S. Pat. Nos. 4,413,108, 4,447,588, 4,500,608 and 4,528,059, each speak to such a system, and the entirety of each of which is hereby expressly incorporated herein by reference.

These cure accelerators are useful individually or in combination, or as primers, for use with anaerobic curable compositions.

In addition to the (meth)acrylate-functionalized poly(acrylate)s described above, additional (meth)acrylate monomers may be chosen for use therewith as well. Such additional (meth)acrylate monomers may be chosen from a wide variety of materials, such as those represented by $H_2C=CGCO_2R^4$, where G may be hydrogen, halogen or alkyl groups having from 1 to about 4 carbon atoms, and $R^4$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate-functionalized poly(acrylate) should comprise from about 10 to about 90 percent by weight of the composition, such as about 60 to about 90 percent by weight, based on the total weight of the composition.

The inventive compositions may also include other conventional components, such as free radical initiators, inhibitors of free radical generation, and metal catalysts, such as iron and copper. Metal catalysts are generally undesirable in one-part anaerobic formulations (hence the use of sequestering agents to precipitate metals). In two-part anaerobic formulations, metal catalysts may be added to part of the formulation that does not contain peroxy compound or other initiator.

A number of well-known initiators of free radical polymerization are typically incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

Stabilizers and inhibitors (such as phenols including hydroquinone and quinones) may also be employed to control and prevent premature peroxide decomposition and polymerization of the composition of the present invention.

The anaerobic cure system may be used in amounts of about 0.1 to about 5 percent by weight, such as about 1 to about 2 percent by weight, based on the total weight of the composition.

The combination of a copper (I) salt and a sequestering agent is formed from a copper (I) salt and a sequestering or chelating agent [such as the tetrasodium salt of ethylenediamine tetraacetic acid ("EDTA")]. The sequestering agents or chelating agent may ordinarily be present in the compositions in an amount from about 0.001 percent by weight to about 0.1 percent by weight, based on the total weight of the composition.

Additional components have been included in traditional anaerobic curable compositions to alter the physical properties of either the curable compositions or the reaction products thereof. For instance, thickeners, non-reactive plasticizers, fillers, toughening components (such as elastomers and rubbers), and other well-known additives may be incorporated therein where the art-skilled person believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The inventive compositions may have beneficial properties making them suitable for use ingasketing and composite applications. The compositions of this invention demonstrate particularly good bond strength on steel, glass and aluminum. An appropriate primer may be applied to a surface of the chosen substrate to enhance cure rate. See e.g. U.S. Pat. No. 5,811,473 (Ramos).

The invention also provides a process for preparing a reaction product from the anaerobic adhesive composition of the present invention, the steps of which include applying the composition to a desired substrate surface and exposing the composition to an anaerobic environment for a time sufficient to cure the composition.

In view of the above description of the present invention, it is clear that a wide range of practical opportunities is provided. The following examples are provided for illustrative purposes only, and are not to be construed so as to limit in any way the teaching herein.

EXAMPLES

Example 1

Acrylate-terminated polyacrylate resins from Kaneka—RC200C and RC200M—were observed to have poor shelf stability in conventional anaerobic compositions. The conventional approach of adding radical inhibitors (naphthoquinone in this case) did not have any appreciable impact on stability of these systems. However, by increasing the concentration of the chelating agent (sodium ethylenediaminetetramine, or NaEDTA), stable one-component anaerobic compositions were achieved. Contrary to known descriptions, the chelating agents used did not precipitate metal contaminants but rather allowed for transparent, one-component compositions.

Three sample compositions were prepared and are given in Table 1; composition 1 is presented as a control (conventional concentrations of naphthoquinone and NaEDTA), composition 2 has double the conventional concentration of naphthoquinone, and composition 3 has double the conventional concentration of NaEDTA. The conventional concentrations are those found in commercial anaerobic compositions, such as Loctite® Gasket Eliminator 515.

TABLE 1

| Component | 1 | 2 | 3 |
|---|---|---|---|
| 1-acetyl-2-phenylhydrazine (APH) | 0.39 | 0.39 | 0.39 |
| 2-phenoxyethyl acrylate (SR339) | 13.39 | 13.49 | 13.52 |
| 2-phenylethyl methacrylate | 40.12 | 40.33 | 40.42 |
| Saccharin (BS) | 0.68 | 0.77 | 0.77 |
| Maleic acid | 0.78 | 0.77 | 0.76 |
| Kaneka RC200C | 36.65 | 36.14 | 35.76 |
| Dye (PM4B) | 0.12 | 0.10 | 0.09 |
| Cumene hydroperoxide (CHP) | 1.56 | 1.55 | 1.52 |
| Silica filler | 5.50 | 5.53 | 5.39 |
| 5% Napthoquinone in PEGMA | 0.13 | 0.27 | 0.11 |
| 3.5% NaEDTA in propylene glycol/water | 0.68 | 0.65 | 1.27 |
| Net naphthoquinone concentration (ppm) | 0.0650 | 0.1350 | 0.0550 |
| Net NaEDTA concentration (ppm) | 0.2380 | 0.2275 | 0.4445 |
| Bulk gel time (hr; PP jar at room temperature) | <16 | <16 | >16 |

Sixteen hours after preparation, composition 1 was observed to have completely solidified under ambient conditions. In the same time frame, composition 2 has also formed a soft gel. Composition 3, however, remained liquid and flowable, even after more than 16 hours from preparation.

Two additional compositions were prepared and are shown below in Table 2.

TABLE 2

| Component | 4 | 5 |
|---|---|---|
| APH | 0.32 | 0.31 |
| PEGMA | 11.85 | 11.60 |
| BS | 1.08 | 1.06 |
| Kaneka RC200C | 74.99 | 73.25 |
| Acrylic acid | 4.40 | 4.33 |
| Fumed silica | 3.16 | 5.19 |
| 5% napthoquinone in PEGMA | 0.12 | 0.13 |
| 3.5% NaEDTA in propylene glycol/water | 0.70 | 1.49 |
| CHP | 3.37 | 2.64 |
| Net naphthoquinone concentration (ppm) | 0.062 | 0.066 |
| Net NaEDTA concentration (ppm) | 0.247 | 0.520 |
| Time to gel (min; ambient conditions) | <0.5 | n.d.; >24 hr |

Composition 4 gelled in the mixer within 30 seconds, whereas composition 5, with a higher NaEDTA content, was much more stable at room temperature. No gelation was observed with composition 5 as it is described in Table 2; the formulation (still ungelled) was used up one day after preparation.

Example 2

Here, anaerobic and UV curable versions of compositions containing one or the other of (meth)acrylate-functionalized poly(acrylate)s and multifunctional polyether urethane methacrylates, such as for the latter polyether polyol urethane methacrylate molecular weight range 1500-12000 daltons ("PEUMA"), were prepared and evaluated for performance. The anaerobic version was applied and cured between two sheets of Mylar (polyethylene terephthalate) coated with an anaerobic activator so that a proper cure environment could be created, which resulted in a product that could be evaluated in an evaluation comparable in manner to a UV curable version.

TABLE 3

Anaerobically Curable Compositions

| Component | 6 PEUMA | 7 RC200C |
|---|---|---|
| APH | 0.31 | 0.31 |
| PEGMA | 13.28 | 12.00 |
| 2-phenylethyl methacrylate | 40.12 | 40.33 |
| BS | 1.04 | 1.05 |
| Acrylic acid | 4.2 | 4.31 |
| Resin | 72.01 | 72.92 |
| Copper (II) | Trace | Trace |
| CHP | 3.24 | 2.63 |
| Silica Filler | 5.09 | 5.17 |
| 5% napthoquinone in PEGMA | 0.15 | 0.13 |
| 3.5% NaEDTA in propylene glycol/water | 0.68 | 1.48 |

TABLE 4

UV Curable Compositions

| Component | 6<br>PEUMA | 7<br>RC200C |
|---|---|---|
| PEGMA | 12.18 | 12.17 |
| 2-phenylethyl methacrylate | 40.12 | 40.33 |
| IRGACURE 2020 | 1.03 | 1.01 |
| Acrylic acid | 4.51 | 4.51 |
| Resin | 76.84 | 76.87 |
| Copper (II) | 0.00 | 0.00 |
| Fumed Silica filler | 5.44 | 5.44 |

In Table 5 below, tensile strength and elongation performance are provided on each of the anaerobic and UV curable compositions found in Tables 3 and 4, as regards the PEUMA resin and the Kaneka RC200C resin. "Oil-aged" specimens were immersed in Mobil 1 synthetic 0W-30 motor oil for a period of time of one week at a temperature of 150° C.

TABLE 5

|  |  | Fresh | Oil-Aged | % Change |
|---|---|---|---|---|
| Anaerobic: |  |  |  |  |
| Tensile | PEUMA | 1303 | 2139 | 64.16 |
|  | RC200C | 357 | 326 | 8.68 |
| Elongation | PEUMA | 32 | 3.4 | 89 |
|  | RC200C | 75 | 38 | 49 |
| UV: |  |  |  |  |
| Tensile | PEUMA | 1599 | 115 | 92.8 |
|  | RC200C | 649 | 415 | 36.1 |
|  | PEUMA | 30 | 3 | 90 |
| Elongation | RC200C | 83 | 57 | 31 |

Comparing the percent change (as discussed in more detail below) in either the anaerobically cured or the UV cured compositions for tensile strength an elongation, the smaller percent change is desirable and indicative of more robust performance in a gasketing application. This smaller percent change is observed with the Kaneka RC200C resin-based composition.

Example 3

In order to make anaerobic test sheets, copper (II) acetylacetonate was added at a low level (<0.005 wt %) to the anaerobic compositions, immediately prior to test sheet assembly. The test sheets were typically prepared on the order of 20 mil (0.020 inch) thick and between two "inactive" substrates—Mylar (poly(ethylene terephthalate)) films. Gelation of the anaerobic composition was observed within a period of time of about 15-45 seconds after copper (II) addition, but the working time was long enough to allow production of viable test sheets with thicknesses ranging from 20-75 mil.

In the examples below, copper (II) was added to the compositions prior to test sheet assembly as a dispersion of copper (II) acetylacetonate in PEGMA. The dispersion was prepared by shaking 7 mg of copper (II) acetylacetonate in 10.048 g PEGMA.

Control Composition with PEUMA Resin

The base anaerobic composition was prepared on a 150 g scale as follows:

TABLE 6

| Component | Weight % |
|---|---|
| Saccharin | 1.06 |
| APH | 0.31 |
| PEGMA | 11.58 |
| 5% napthoquinone in PEGMA | 0.15 |
| 3.5% NaEDTA in propylene glycol/water | 0.70 |
| PEUMA | 73.42 |
| Acrylic Acid | 4.29 |
| Fumed Silica | 5.19 |
| CHP | 3.31 |

The composition set forth in Table 6 is referred to as composition 8.

A first test sheet was prepared by taking approximately 1 g of the Cu(II)/PEGMA dispersion adding it to 19.47 g of the base anaerobic composition (final Cu(acac)$_2$ concentration ~0.003 wt %). The mixture was then mixed for 10 seconds at 2500 rpm in a DAC 400 FVZ speed mixer. Working time after removal from the mixer was ~15 seconds; a test sheet with a thickness of ~0.035 inches was prepared within the working time and allowed to cure at ambient temperature for a period of time of 24 hours. Five tensile specimens ("dogbones") were pressed from the cured test sheet.

A second test sheet was prepared by taking approximately 0.49 g of the Cu(II)/PEGMA dispersion and adding it to 25.07 g of the base anaerobic composition (final Cu(acac)$_2$ concentration ~0.0013 wt %). The mixture was then mixed for 10 seconds at 2500 rpm in the speed mixer. The second test sheet was allowed to cure for a period of time of 24 hours. Five dogbones were pressed from the cured test sheet, as before, and immersed in Mobil 1 synthetic 0W-30 motor oil for a period of time of one week at a temperature of 150° C.

Composition with (Meth)Acrylate-Functionalized Poly (Acrylate)

The base anaerobic composition for these compositions was prepared on a 60 g scale as follows:

TABLE 7

| Component | Weight % |
|---|---|
| Saccharin | 1.09 |
| APH | 0.32 |
| PEGMA | 11.91 |
| 5% napthoquinone in PEGMA | 0.13 |
| 3.5% NaEDTA in propylene glycol/water | 1.53 |
| Kaneka RC200C | 75.23 |
| Acrylic Acid | 4.45 |
| Fumed Silica | 5.33 |

The composition set forth in Table 7 is referred to as composition 9.

The EDTA concentration was doubled with this composition to overcome instability arising from trace residual metal ions in the Kaneka RC200C resin; also, CHP was not added until immediately before the addition of copper (II).

A first test sheet was prepared by taking 0.351 g of CHP adding it to 26.48 g of the base anaerobic composition set forth in Table 7 with mixing for 10 seconds at 2500 rpm. Two drops (~0.05 g) of the Cu(II)/PEGMA dispersion were added to the formulation; the mixture was then mixed for another 10 seconds at 2500 rpm in the speed mixer (final Cu(acac)$_2$ concentration ~0.00013 wt %). Working time for the composition was ~15 seconds; a test sheet was prepared and allowed to cure for a period of time of 24 hours. Five dogbones were pressed from the cured film; the cured material is soft, pliable, and somewhat "gummy".

A second test sheet was prepared by taking 0.363 g of CHP and adding it to 25.64 g of the base anaerobic composition set forth in Table 7 with mixing for 10 seconds at 2500 rpm. Five drops (~0.12 g) of the Cu(II)/PEGMA dispersion were added to the formulation; the mixture was then mixed for another 10 seconds at 2500 rpm in the speed mixer (final $Cu(acac)_2$ concentration ~0.0003 wt %). Working time for the composition was 15-20 seconds; a test sheet was prepared and allowed to cure for a period of time of 24 hours. Five dogbones were pressed from the cured test sheet and immersed in Mobil 1 synthetic 0W-30 motor oil for one week at a temperature of 150° C.

Tensile Strength

FIG. 1 illustrates the tensile strengths of anaerobically curable compositions set forth in Tables 6 and 7, referred to as compositions 8 and 9, respectively, both before and after aging in oil. Composition 9 (based on Kaneka RC200C) provides lower initial tensile strength than composition 8 (based on PEUMA resin); however, after aging for one week in Mobil 1 synthetic 0W-30 motor oil at a temperature of 150° C., the tensile strength of composition 8 decreased by only ~9% whereas composition 9 exhibited a tensile strength increase of 64%. The percent change is the variable examined closely for compression set data. Thus, even if tensile strength increases, a greater magnitude change (e.g., +64%) is indicative of poorer oil resistance than a smaller change (e.g., -9%).

Elongation

Figure 2:
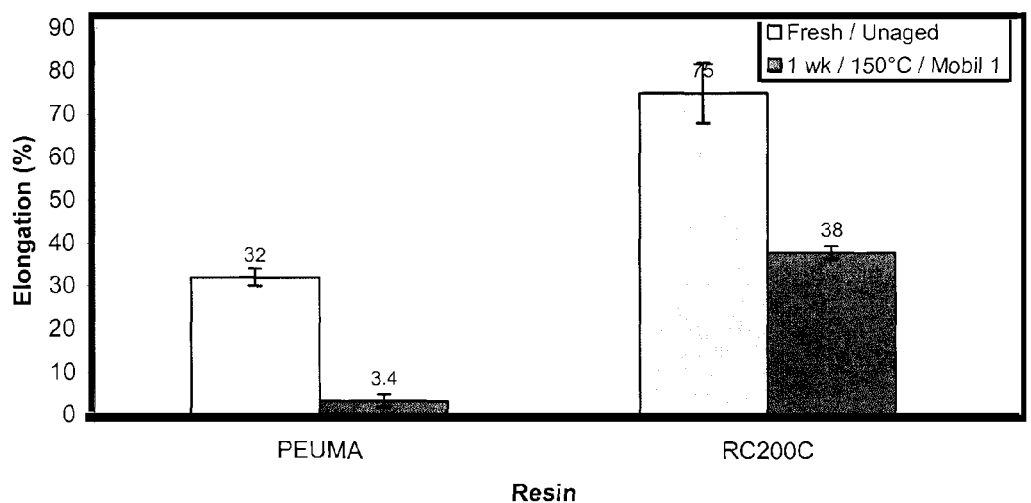
FIG. 2 depicts a chart of elongation values captured for a PEUMA composition and a Kaneka RC200C composition, each having been exposed to ageing conditions in Mobil 1 synthetic 0W-30 motor oil for a period of time of one week at a temperature of 150° C. and being unaged.

FIG. 2 illustrates the elongations at break of the anaerobic compositions set forth in Tables 6 and 7, again both before and after aging in oil. Composition 9 provides more flexibility with higher elongation than composition 8. After aging for one week in Mobil 1 synthetic 0W-30 motor oil at a temperature of 150° C., the elongation of composition 9 decreased by ~49% whereas composition 8 exhibited an elongation decrease of 89%.

What is claimed is:

1. An anaerobic curable composition, comprising:
   (a) a (meth)acrylate component comprising a (meth)acrylate-functionalized poly(acrylate) having an average molecular weight in the range of 1,000 to 100,000 and a narrow molecular weight distribution (Mw/Mn) of 1.1 to 1.6;
   (b) an anaerobic cure system; and
   (c) a combination of copper salt and a sequestering agent.

2. The composition according to claim 1, further comprising a mono-functional (meth)acrylate component represented by $H_2C=CGCO_2R^1$, wherein G is a member selected from the group consisting of H, halogen and alkyl having from 1 to about four carbon atoms, and $R^1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

3. The composition according to claim 1, further comprising a (meth)acrylate component selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

4. The composition according to claim 1, wherein the anaerobic cure system comprises one or more of the following: the combination of saccharin, toluidines, acetyl phenylhydrazine, maleic acid, and quinones;

B.

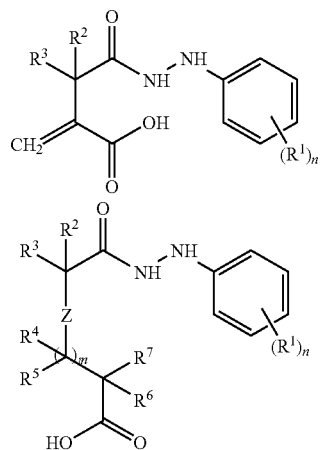

wherein $R^1$, $R^2$ and $R^3$ are each independently selected from the group consisting of hydrogen or $C_{1-4}$; Z is a carbon-carbon single bond or carbon-carbon double bond; m is 0 or 1; and n is an integer between 1 and 5;

C.

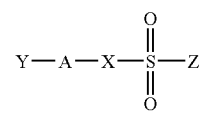

wherein Y is selected from the group consisting of an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded therefrom;

D.

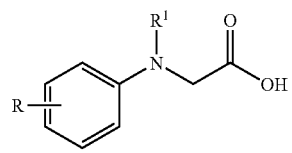

wherein R is selected from the group consisting of hydrogen, halogen, alkyl, alkenyl, hydroxyalkyl, hydroxyalkenyl, carboxyl, or sulfonato, and $R^1$ is as defined above and alkenyl, hydroxyalkyl, hydroxyalkenyl, or aralkyl;

E. trithiadiaza pentalenes embraced by the following structure:

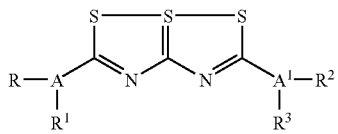

wherein A and A¹ are each independently selected from the group consisting of O and N; and R, R¹, R² and R³ are the same or different, are as defined above and cycloalkyl, cycloclkenyl, and aryl, having from 1 to about 30 carbon atoms, and may be substituted or interrupted with a heteroatom, and heterocyclic structures, or R¹ and R³ taken together may join to form a cyclic structure having from about 20 to about 28 ring atoms, and together represent dialkyl substituted polyether structures that may be substituted or interrupted with the trithiadiaza pentalene structure, which itself may or may not be substituted by A¹, R², or R³, as defined above; and F. the combination of a triazine and a thiol.

5. The composition according to claim 1, wherein the (meth)acrylate-functionalized poly(acrylate) is derived from a blend of at least 80% by weight of certain mono-functionalized (meth)acrylate monomers selected from alkyl, arylalkyl, hydroxy alkyl, and phenyl (meth)acrylates and 0-20% by weight of mono-functional, non-(meth)acrylate vinyl monomers selected from maleic anhydride, maleate, fumarate and vinyl esters, acrylonitrile, styrene, butadiene, vinylaziactone, N,N-dimethylacrylamide, N-vinylpyrrolidinone, acryloyl morpholine, N-vinylcaprolactam and N-vinylformate.

6. The composition according to claim 1, wherein the (meth)acrylate-functionalized poly(acrylate) comprises the structural unit in its backbone:

-(A)$x$-(B)$y$- wherein A represents one or more co-monomer units selected from the group consisting of non-functional alkyl or arylalkyl mono (meth)acrylates and B represents one or more co-monomer units selected from the group consisting of alkyl or arylalkyl mono-functionalized (meth)acrylates selected from alkoxyalkyl or aryloxyalkyl with or without substitution with groups containing the hetero atoms, O, S, N, P, or halogen, or non-(meth)acrylate vinyl monomers, wherein x and y represent the fraction of A and B, respectively, and x is at least 0.30 and at most 0.95 and y is at least 0.05 and at most 0.70.

7. The composition according to claim 1, wherein the combination of a copper salt and a sequestering agent comprises a member selected from the group consisting of copper chlorides, copper bromides and copper iodides copper chlorides, copper bromides and copper iodides as the copper salt.

8. The composition according to claim 1, wherein the combination of a copper salt and a sequestering agent comprises the tetrasodium salt of ethylenediamine tetraacetic acid as the sequestering agent.

9. A composition comprising a bond formed between two mated substrates with the composition of claim 1.

10. The composition of claim 1, wherein the (meth)acrylate-functionalized poly(acrylate) contains at least two (meth)acrylate functional groups.

11. The composition of claim 1, being a one-component, anaerobic curable composition.

12. The composition of claim 1, being a gasket composition.

13. The composition of claim 1, wherein the (meth)acrylate-functionalized poly(acrylate) has an average molecular weight of 5,000 to 50,000.

14. A process for preparing a gasket comprising the steps of:
providing an anaerobically curable composition according to claim 1;
applying the curable composition onto a substrate; and
exposing the composition to an anaerobic environment for a time sufficient to cure the composition;
wherein the cured composition has properties suitable for gasket applications.

15. The process for preparing a gasket of claim 14, further comprising sealingly engaging a second substrate to the applied curable composition.

16. An anaerobically curable, gasket composition, comprising:
(a) a telechelic, (meth)acrylate-functionalized poly(acrylate) having an average molecular weight of 1,000 to 100,000;
(b) an anaerobic cure system; and
(c) a combination of copper salt and a sequestering agent.

17. The gasket composition of claim 16, being a one-component composition.

18. The gasket composition of claim 16, wherein the (meth)acrylate-functionalized poly(acrylate) has a narrow molecular weight distribution (Mw/Mn) of 1.1 to 1.6.

19. The gasket composition of claim 16, wherein the (meth)acrylate-functionalized poly(acrylate) has an average molecular weight of 5,000 to 50,000.

* * * * *